United States Patent Office 3,655,604
Patented Apr. 11, 1972

3,655,604
COATING COMPOSITIONS CONTAINING FLUORO-
CARBON POLYMER AND COLLOIDAL SILICA
Clifford H. Strolle, Springfield, Pa., assignor to E. I. du
Pont de Nemours and Company, Wilmington, Del.
No Drawing. Filed May 15, 1969, Ser. No. 825,041
Int. Cl. C08f 45/24
U.S. Cl. 260—29.6 F          6 Claims

ABSTRACT OF THE DISCLOSURE

A composition for priming a surface to improve adhesion of a fluorocarbon polymer topcoat. The composition contains an ammonia stabilized colloidal silica sol, a particulate fluorocarbon polymer and a liquid carrier.

BACKGROUND OF THE INVENTION

This invention relates to coating compositions. It is more particularly directed to primer compositions for improving the adhesion of fluorocarbon polymer coatings to their substrates.

In recent years, use of fluorocarbon polymers as lubricious coatings has become widespread. Cookware coated with polytetrafluoroethylene has become especially popular because of its non-stick character.

The physical nature of these fluorocarbon polymers makes it difficult to bond them to their substrates well enough to prevent the coatings from peeling away or blistering during use. This is especially true of polytetrafluoroethylene.

SUMMARY OF THE INVENTION

I have found that adhesion of a fluorocarbon polymer coating to its substrate can be significantly improved if a composition of (a) particulate fluorocarbon polymer,
(b) an ammonia stabilized colloidal silica sol, and
(c) liquid carrier is used to prime the substrate before the fluorocarbon polymer topcoat is applied.

The colloidal silica sol I use in my composition is an aqueous colloidal silica sol stabilized with ammonia. The siica sol I prefer to use is one containing about 30% solids, and having a pH of 9.6.[1] Such a silica sol can be prepared by the general methods shown in U.S. Pat. 3,012,973.

The colloidal silica is ordinarily present in my composition at a concentration of from about 10% through about 50% by weight of the total of silica and fluorocarbon polymer solids, preferably from about 20% through about 30%. I especially prefer a composition containing about 25% through 30% of colloidal silica. For certain applications one may use from 10–20% of colloidal silica, or he may choose to exceed the preferred ranges and use from about 40% to about 50%. In certain cases it may even be desirable to use as little as 5–10% of colloidal silica or as much as 60–70%, although with lower and higher percentages, the benecial effects of my invention tend to be minimized.

The fluorocarbon polymer I use in my composition is of hydrocarbon monomers completely substituted with fluorine atoms or a combination of fluorine atoms and chlorine atoms. Included in this group are polytetrafluoroethylene, copolymers of tetrafluoroethylene and hexafluoropropylene in all monomer unit ratios, and fluoro-

[1] Such a sol is available from E. I. du Pont de Nemours and Co. as "Ludox" ® as colloidal silica.

chlorocarbon polymers such as polymonochlorotrifluoroethylene. Polytetrafluoroethylene is preferred.

The fluorocarbon polymer I use is particulate. The particles should be small enough to pass through the nozzle of a spray gun without clogging it and small enough to give the resulting film integrity. In ordinary situations, the particle should be no larger than about 0.35 micron in the longest dimension.

Although I can use a dry flour or powder of fluorocarbon polymber and provide a liquid carrier separately, I prefer to use the polymer in the form of an aqueous dispersion because it is most easily obtained on the market in that form. A dispersion of fluorocarbon polymer in an organic liquid miscible with water, such as ethanol, isopropanol, acetone or a Cellosolve, can also be used. In any case, the liquid also serves as a carrier for my composition.

The fluorocarbon polymer is ordinarily present in my composition at a concentration of from about 50% through about 90%, by weight of the total of flurocarbon polymer and silica solids. I prefer to use from about 70% through about 80% and especially prefer a composition containing 70–75% of fluorocarbon polymer. For some applications one may use as little as 30% to 45% of fluorocarbon polymer, or even as little as 10% to 25%. Similarly, for certain uses, one might elect to use a composition containing as much as 90–95% of fluorocarbon polymer or even more, although such a composition tends to be thicker than is desirable.

My composition is made by mixing proper amounts of a suitable aqueous colloidal silica sol and a fluorocarbon polymer dispersion. This composition can be pigmented by preparing a suitable pigment dispersion by a conventional technique and then simply adding this pigment dispersion to the composition.

The resulting primer composition can be applied by spraying, brushing, dipping, roller-coating or the like. If the surface to be coated is metal, it is preferably pretreated by grit-blasting, by the flame spraying of a metal or a metal oxide, or by frit-coating the substrate. After application, the primer coat is air-dried and then baked at 230–400° C. for 10 to 20 minutes.

This primer coat is then topcoated with a conventional clear or pigmented fluorocarbon polymer enamel, and baked in the usual way, to give an adherent fluoropolymer coating.

Although I get the best coating with the two-coat system just described, I also get a strongly adherent fluorocarbon polymer coating with a one-coat operation. To do this, I apply a thicker coat of the primer composition, which may contain pigments and surfactants; this coat is then dried and baked as in the two-coat system. The advantage of this one-coat system in terms of labor cost is obvious.

My composition is most useful for priming metal cookware, especially frypans, for coating with polytetrafluoroethylene, but it can also be used to prime other articles requiring fluorocarbon polymer films permanently bonded to their substrates. These articles can be made of glass or other materials that can withstand the baking temperatures used. For example, my composition can be used to prime or coat bearings, valves, wire, metal foil, boilers, pipes, ship bottoms, oven liners, iron soleplates, waffle irons, ice cube trays, snow shovels and plows, chutes, conveyors, dies, tools such as saws, files and drills, hoppers, and other industrial containers and molds.

Those skilled in this art will be able to practice my invention more easily by first referring to the following illustrative example. In this example, all parts are by weight.

A primer composition was prepared by thoroughly mixing

| | Parts |
|---|---|
| Polytetrafluoroethylene dispersion, aqueous, 60% solids | 48.1 |
| Ludox AS (30% solids) | 38.5 |
| Pigment dispersion, white, 44.5% TiO$_2$ | 6.1 |

This composition was sprayed on a grit-blasted, frit-coated aluminum frypan to a thickness of about 0.008 mm. (dry). The pan was then baked 20 minutes at 232° C.

The resulting primed pan was then top-coated with an enamel having the composition

| | Parts |
|---|---|
| Polytetrafluoroethylene dispersion, aqueous, 50% solids | 99.5 |
| Sodium salt of the sulfuric acid ester of a mixture of long chain alcohols (predominantly lauryl alcohol) | 0.5 |

This topcoat enamel was applied by spraying it over the primer to a thickness of about 0.025 mm. (dry) and then baking it for 20 minutes at 400° C.

The resulting coating of polytetrafluoroethylene adhered well to the frypan, with no blistering or peeling after extended use.

I claim:
1. A composition consisting essentially of
   (a) from about 50% through about 90%, by weight of the total of (a) and (b) solids, of particulate polymer of hydrocarbon monomers completely substituted with fluorine atoms or a combination of fluorine atoms and chlorine atoms;
   (b) from about 10% through about 50%, by weight of the total of (a) and (b) solids, of an ammonia stabilized colloidal silica sol containing about 30% solids and having a pH of 9.6, and
   (c) a liquid carrier.
2. The composition of claim 1 containing from about 70% through about 80% of fluoropolymer and from about 20% through about 30% of silica sol.
3. The composition of claim 2 containing from about 70% through about 75% of fluoropolymer and from about 25% through about 30% of silica sol.
4. The composition of claim 1 wherein the fluoropolymer is polytetrafluoroethylene and the liquid carrier is water.
5. The composition of claim 2 wherein the fluoropolymer is polytetrafluoroethylene and the liquid carrier is water.
6. The composition of claim 3 wherein the fluoropolymer is polytetrafluoroethylene and the liquid carrier is water.

References Cited
UNITED STATES PATENTS

| | | | |
|---|---|---|---|
| 2,478,229 | 8/1949 | Berry | 260—29.6 |
| 2,592,147 | 4/1952 | Ikeda | 260—29.6 |
| 2,825,664 | 3/1958 | Huntsberger | 260—29.6 |
| 2,906,658 | 9/1959 | Doban | 260—29.6 |
| 3,047,421 | 7/1962 | Taylor | 260—29.6 |

HAROLD D. ANDERSON, Primary Examiner

U.S. Cl. X.R.

117—49, 72, 75, 161 UF